US012413840B2

(12) United States Patent
Voigt et al.

(10) Patent No.: US 12,413,840 B2
(45) Date of Patent: Sep. 9, 2025

(54) EYE TRACKING KIT APPLICABLE TO EYE GLASSES

(71) Applicant: Viewpointsystem GmbH, Vienna (AT)

(72) Inventors: Johannes Voigt, Feldkirch (AT);
Michael Hauser, Altlengbach (AT);
Frank Linsenmaier, Weinstadt (DE);
Nils Berger, Schaan (LI)

(73) Assignee: Viewpointsystem GmbH, Vienna (AT)

( * ) Notice: Subject to any disclaimer, the term of this patent is extended or adjusted under 35 U.S.C. 154(b) by 30 days.

(21) Appl. No.: 18/267,994

(22) PCT Filed: Dec. 21, 2020

(86) PCT No.: PCT/EP2020/087431
§ 371 (c)(1),
(2) Date: Jun. 16, 2023

(87) PCT Pub. No.: WO2022/135660
PCT Pub. Date: Jun. 30, 2022

(65) Prior Publication Data
US 2024/0056671 A1 Feb. 15, 2024

(51) Int. Cl.
*H04N 23/57* (2023.01)
*G02B 27/00* (2006.01)
*G02C 11/00* (2006.01)
*G06T 7/70* (2017.01)
*H04N 23/51* (2023.01)

(52) U.S. Cl.
CPC ......... *H04N 23/57* (2023.01); *G02B 27/0093* (2013.01); *G02C 11/10* (2013.01); *G06T 7/70* (2017.01); *H04N 23/51* (2023.01); *G06T 2207/30196* (2013.01)

(58) Field of Classification Search
CPC .......... H04N 23/57; H04N 23/51; G06T 7/70; G06T 2207/30196; G02B 27/0093; G02C 11/10
See application file for complete search history.

(56) References Cited

U.S. PATENT DOCUMENTS

| 6,113,237 | A | * | 9/2000 | Ober | A61B 3/113 |
| | | | | | 351/210 |
| 10,460,473 | B1 | * | 10/2019 | McMichael | G06T 7/80 |
| 10,722,114 | B1 | | 7/2020 | Berme et al. | |
| 2010/0134761 | A1 | | 6/2010 | Johns et al. | |
| 2015/0185503 | A1 | | 7/2015 | Tate et al. | |

(Continued)

FOREIGN PATENT DOCUMENTS

| CN | 109254420 A | 1/2019 |
| EP | 3521911 A1 | 8/2019 |

OTHER PUBLICATIONS

International Search Report from corresponding International Patent Application No. PCT/EP20/87431, dated Sep. 23, 2021.

*Primary Examiner* — James T Boylan
(74) *Attorney, Agent, or Firm* — Liang & Hennessey LLP; Brian Hennessey (57) ABSTRACT

The present invention relates to an eye tracking kit applicable to a normal pair of eye glasses or to known augmented/virtual reality glasses or to visual remote guidance devices in general. The invention further deals with a method for fastening the kit to said kind of glasses. Eye glasses in general, using the present invention, may turn into an eye tracking device or gaze tracking device.

20 Claims, 9 Drawing Sheets

(56) References Cited

U.S. PATENT DOCUMENTS

| | | | |
|---|---|---|---|
| 2016/0050345 A1* | 2/2016 | Longbotham | H04N 13/239 |
| | | | 348/47 |
| 2016/0139265 A1 | 5/2016 | Yahav et al. | |
| 2016/0171772 A1* | 6/2016 | Ryznar | G02B 27/017 |
| | | | 345/633 |
| 2016/0206196 A1 | 7/2016 | Pfleger et al. | |
| 2017/0314732 A1* | 11/2017 | Minn | B60R 11/02 |
| 2018/0103903 A1* | 4/2018 | Tzvieli | A61B 5/015 |
| 2020/0081247 A1* | 3/2020 | Khaderi | A61B 5/053 |
| 2022/0342224 A1* | 10/2022 | Kassner | G02B 27/0179 |
| 2024/0015410 A1* | 1/2024 | Kassner | G06F 3/013 |
| 2024/0147031 A1* | 5/2024 | Kassner | G02B 27/0172 |
| 2024/0406533 A1* | 12/2024 | Voigt | G02B 27/0179 |

\* cited by examiner

EYE TRACKING KIT APPLICABLE TO EYE GLASSES

FIELD OF THE INVENTION

The present invention discloses an eye tracking kit applicable to a normal pair of eye glasses or to known augmented/virtual reality/mixed reality glasses, or to visual remote guidance devices in general. The invention further deals with a method for fastening the kit to said kind of glasses and with an eye tracking device comprising eye glasses provided with the eye tracking kit.

BACKGROUND OF THE INVENTION

Eye-tracking devices and in particular spectacles usually comprise a camera, which is oriented onto an eye of the spectacles wearer; the coordinates of the pupil and the viewing direction of the eye can be ascertained using such spectacles and displayed on a correspondent display computer device where a second user is able to watch the gaze direction of the wearer on his relevant field of view, via internet live streaming. Together with a so-called field of view video, which is prepared by a further field of view camera arranged on the spectacles in the viewing direction of a user, the point at which the user looks can be ascertained using such spectacles.

US2016/0206196 discloses eye-tracking spectacles comprising two eye cameras arranged in the nose frame of the glasses and a field of view camera in the middle of the glasses, showing the front scenery of the user.

The field of view camera is provided to record a field of view, video including individual and successive field of view images. The recordings of the two eye acquisition cameras and the at least one field of view camera can thus be entered in correlation in the field of view video of the respective gaze point.

Unfortunately US2016/0206196 discloses eye tracking glasses having a frame similar to normal pair of glasses.

Furthermore are known semi finished eye tracking module which need to be implemented in augmented reality glasses or virtual reality glasses. These not finished products consist on a processor connected with two eye cameras via PCB/electronical connections, needing to be connected and integrated in a more complete product.

Known semifinished eye tracking modules exploit the electronical and software architecture and well defined geometric structure of more complex devices like AR/VR glasses in order to be operative.

SUMMARY OF THE INVENTION

The present invention provides an eye tracking kit, the eye tracking kit being a finished product, ready to use once mechanically fastened to the eye glasses, like prescription glasses, sunglasses, safety glasses, specific work glasses, augmented or virtual or mixed reality glasses, or to visual remote guidance devices in general.

The eye tracking kit of the present invention enables a user wearing his/her prescription glasses to use the eye tracking kit to communicate with further devices even remotely connected or to other devices in general.

The eye tracking kit of the present invention enables a user to easily fasten and unfasten an eye tracking kit to/from his/her own glasses.

The eye tracking kit of of the present invention, is easily adaptable to different glasses frames, easy to be cleaned and at the same time firmly attachable to said eye glasses.

The eye tracking kit of the present invention does not interfere with the user's nose, being not in contact with it and/or with the user's field of view, once fastened to the eye glasses.

The eye tracking kit of the present invention, is very light weight and comfortable for the user.

The eye tracking kit of the present invention, is reliable, easy to be used by the user, with a reduced cost in respect to known eye tracking devices.

The present invention also provides a fastening method that can be easily implemented by the user.

Hereinafter are summarized some technical aspects of the present inventions which enable some of the most important purposes to be achieved.

According to a first aspect this invention relates to an eye tracking kit configured to be easily fastened/unfastened to/from a pair of eye glasses, thus creating an eye tracking device, said kit comprising a first component, having a U-shaped portion, housing at least one left eye camera and one right eye camera to detect in a plurality of images pupil positions of the user, said kit further comprising a second component, housing an hanger, configured to easily and stably fasten the kit to a nose bridge or to the central portion of the upper frame of the eye glasses, when the first component is firmly fixed to the second component, in order to form with it a single unitary structure and the second component in turn is fastened to the eye glasses, said kit further comprising electronical components namely at least a data processing unit, a memory, a data interface, enclosed in the first component frame or in the second component frame, said electronical component configured to connect the kit to a computer device remotely connected or to other devices in general, and to send to said computer device eye movement information of the user wearing the eye glasses to which is fastened the eye tracking kit.

Such kit turns a pair of eye glasses into an eye tracking device, allowing a user to wear his/her own eye glasses and, at the same time, sending his/her eye movement information to a computer device remotely connected or to other devices in general.

According to a second aspect this invention relates to a kit wherein the first component and the second component are made to form a single monolithic unitary structure, these features aiming to further simplify the kit structure and to reduce possible accidental movements between the first and second components.

According to a third aspect this invention relates to a kit wherein the kit further comprise a third component frame comprising at least a field of view camera, configured to detect in a plurality of images the field of view of the wearer, said third component being fixed to the second component, when in use.

In this case the kit turns a pair of eye glasses into an gaze tracking device, allowing a user to wear his/her own eye glasses and, at the same time, sending his/her eye movement information over his/her field of view, to a computer device remotely connected or to other devices in general.

According to a fourth aspect this invention relates to a kit wherein the first component, the second component and the third component are made to form a single monolithic unitary structure, these features aiming to further simplify the kit structure and to reduce possible accidental movements between the first, second and third components.

According to a fifth aspect this invention relates to an eye tracking kit configured in such a way that the field of view camera, in the third component, is placed facing outwardly the eye glasses, while the U-shaped portion is placed facing inwardly the eye glasses, said U-shaped portion further comprising two arms, being designed in such a way to arrange themselves laying down on the inner side face of the nose pads of the eye glasses, when the eye tracking kit is fastened to the eye glasses, in order said arms to not interfere with the user's nose bone.

According to a sixth aspect this invention relates to eye tracking kit configured to be easily unfastened from the eye glasses.

According to a seventh aspect this invention relates to an eye tracking device where the eye tracking is fastened to the eye glasses.

According to an eighth aspect this invention relates to a method for fastening the eye tracking kit to an eye glasses or a augmented reality glasses, wherein the eye glasses has at least a nose bridge or a central portion of an upper frame.

According to further aspects this invention relates to further kit, product and method features claimed in the dependent claims of the present specification.

BRIEF DESCRIPTION OF THE DRAWINGS

The structural and functional features of the present invention and its advantages with respect to the known prior art, will become even clearer from the underlying claims, and in particular from an examination of the following description, made with reference to the attached figures which show a preferred but not limited schematic embodiment of the invented method, system, device, in which:

DETAILED DESCRIPTION OF THE INVENTION

In general, this disclosure describes an eye tracking kit, a method for fastening/unfastening the kit to/from a different kind of eye glasses, and an eye tracking device comprising eye glasses provided with the eye tracking kit.

The specifications "right" or "left" or "high" or "low" or "front" or "back" relate to the intended manner of wearing eye glasses and the eye tracking kit by a human being.

Regarding eye glasses 8 in general or prescription glasses, it shall be highlighted that they have at least a part of their frame having the purpose to retaining the lenses, which could be prescription lenses or sun lenses or specific filtering/protective lenses. Furthermore they have at least a portion, so called nose bridge 88, acting as a spacer between the two lenses, able to create the space for the user's nose.

Figure 17:
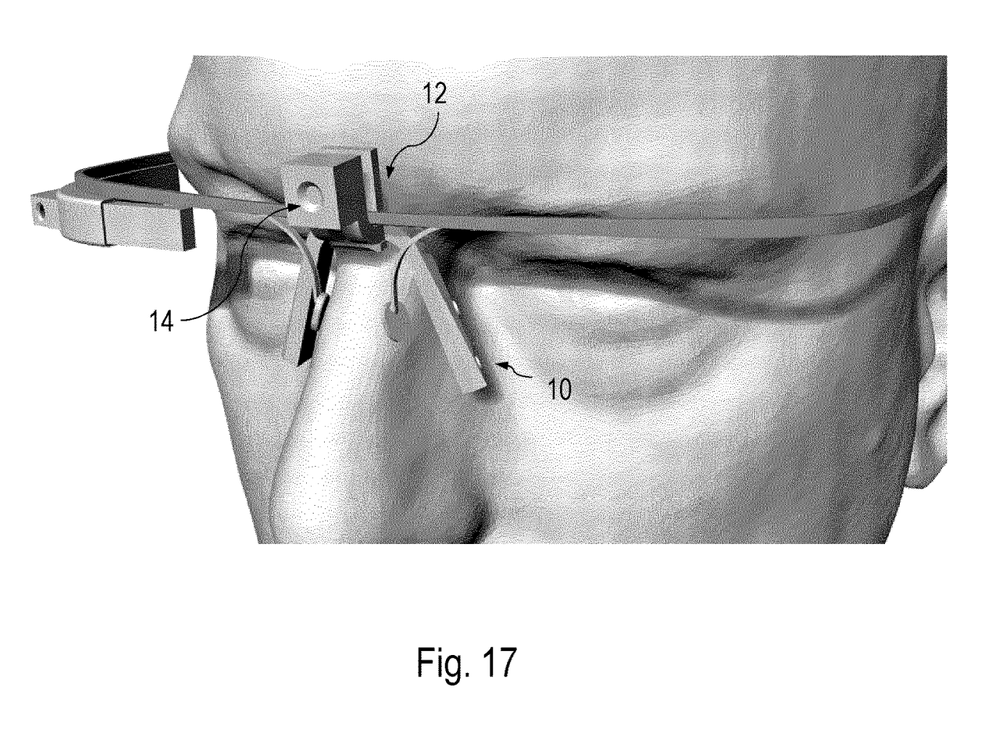
FIG. 17 illustrates a front view of a second preferred monolithic embodiment of the kit according to the present invention, once fastened to Augmented Reality glasses on the central portion of the upper frame.

The nose bridge is a portion necessary in all eye glasses, but in some cases this portion is not clearly detectable, like for example in the ones configured like ski goggles, where a visor replaces the lenses. In some cases said visor has a concave shape where the user's nose could find place and in that case the central portion of the upper frame of the sky glasses, may be a suitable frame portion where the eye tracking kit of the present invention may be fastened (see for instance FIG. 17).

The eye tracking kit, according to the present invention, comprises a first component 10, comprising a first component frame 11, having in turn a U-shaped portion 110. In said U-shaped portion 110 are preferably located a right eye acquisition camera 4 and a left eye acquisition camera 3, which have the purpose of detecting the position of the user's eye (see FIGS. 15, 16).

The kit furthermore comprises a second component 12, having a second component frame 13, housing an hanger 7. Said hanger 7 is configured to easily and stably fasten the kit to the nose bridge 88 of the eye glasses 8 or to the central portion of the upper frame of the eye glasses 8, when the first component 10 is firmly fixed to the second component 12. In that case the first component 10 and the second component 12 form a single unitary structure, to be fastened to the eye glasses 8.

Figure 15:
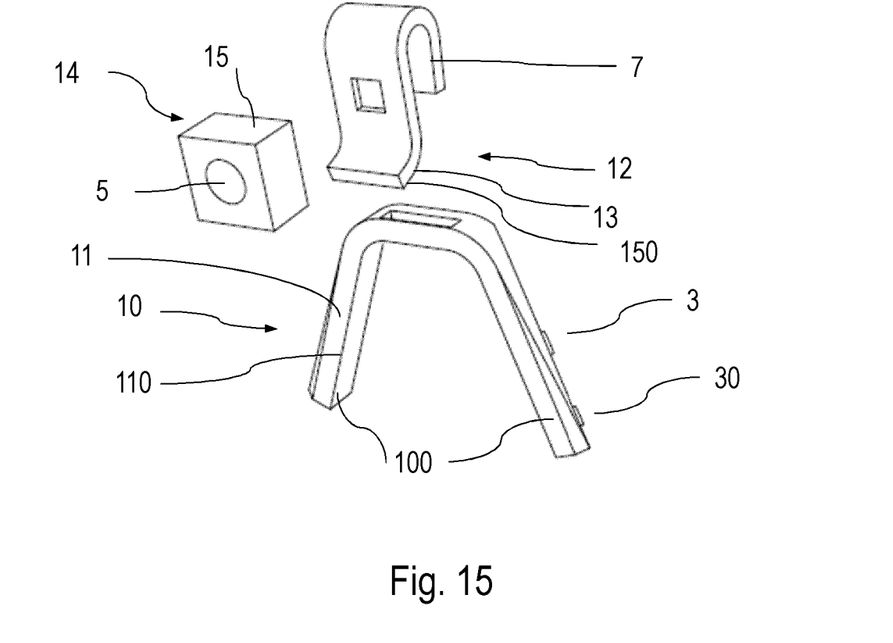
FIGS. 15 and 16 illustrate respectively a front view and a back view of a preferred embodiment of the kit according to the present invention wherein the three main components are separated.
Figure 16:
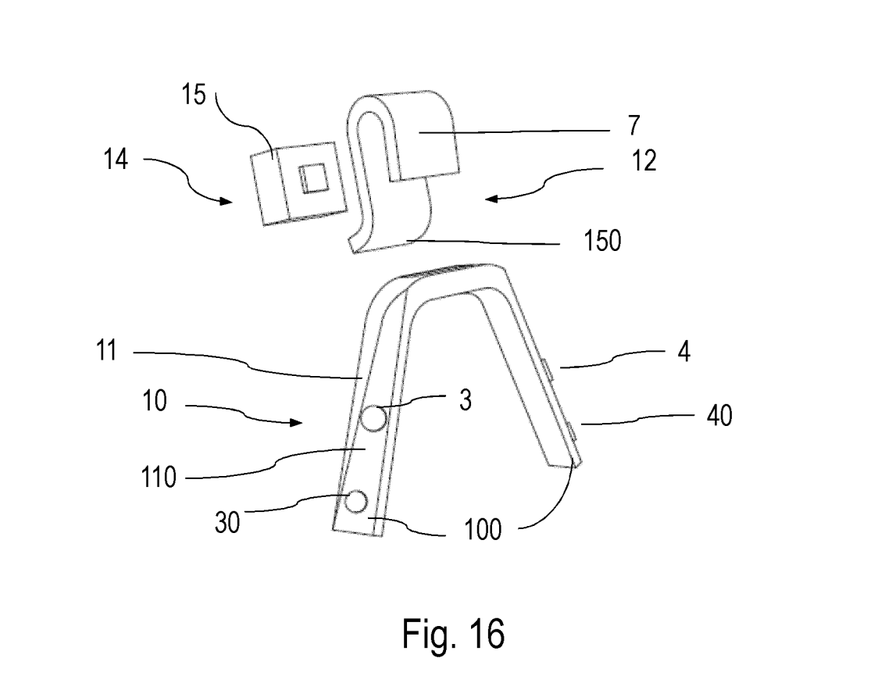

In a further preferred embodiment the first component 10 and the second component 12, are not separated physical components, but are made to form a single monolithic unitary structure, in order to simplify the structure and to avoid possible movements between the components once fixed together (see all figures other than 15, 16).

In order to determine continuously the user's gaze direction over his field of view, when he wears his own eye glasses provided with the present kit, said kit may further comprise a third component 14, having a third component frame 15, comprising at least a field of view camera 5, configured to detect in a plurality of images the field of view of the user. When in use said third component 14 is fixed to the second component 12.

In a further preferred embodiment the first component 10, the second component 12, and the third component 14 are not physical separated components, but are made to form a single monolithic unitary structure (see all figures other than 15, 16).

As already explained a preferred solution relates to a kit wherein the first component 10, the second component 12 and the third component 14 are separated physical components (see FIGS. 15, 16), able to be fixed together mechanically and electronically through known methods and techniques.

Figure 4:
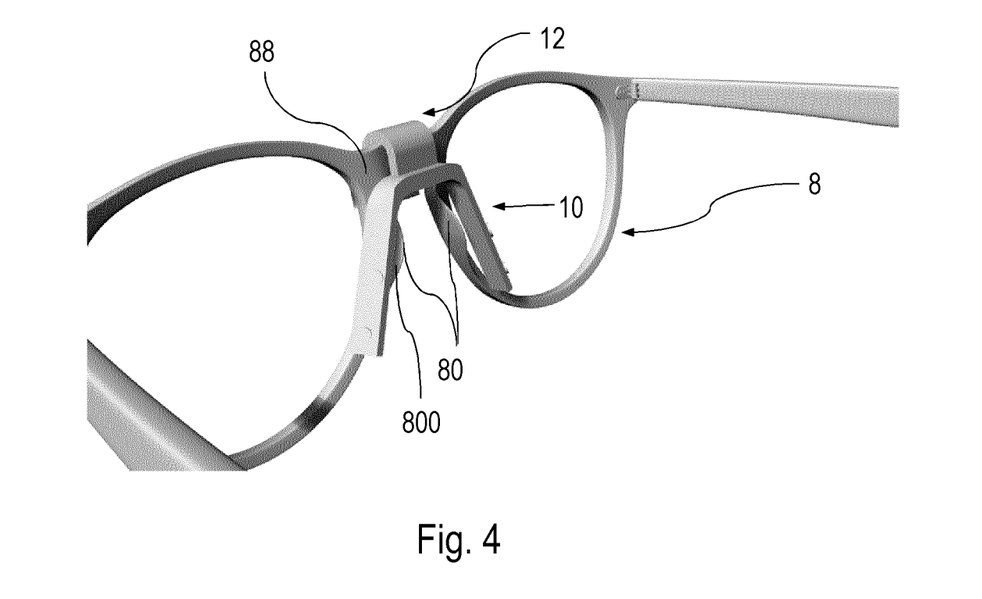

The U-shaped portion 110 is particularly designed for arranging the eye tracking kit on the corresponding U-shaped portion of common eye glasses 8, where finds place nose of a human, without interfering with the user's nose. In fact said U-shaped portion 110 further comprising two arms 100, which are designed in such a way to arrange themselves laying down on the inner side face 800 of the nose pads 80 of the eye glasses 8, when the eye tracking kit is fastened to the eye glasses 8 (see FIG. 4, 17 for instance). This arm 100 particular arrangement, being very close to the nose pads 80, also does not interfere with the field of view of the user's eyes.

The U-shaped part 110 may be made by soft materials, and in particular the arms 100 may be made with flexible material, in order to further better adapt the arm 100 shapes to the eye glasses 8 U-shaped portion.

Due to the integration of the eye acquisition cameras 3, 4 in the U-shaped part 110, the eye tracking kit, do not have any protruding parts, and is therefore suitable to be worn as kit attachable to work spectacles or protective spectacles. The viewing movements of a worker or of a human operating a machine can thus not only be monitored and analysed, but rather can be used directly for controlling the machine, if said eye tracking kit is operatively connected to said machine. In addition, the capability for controlling a machine can thus be monitored, since the physical and mental state of the relevant human can be concluded on the basis of the eye movements, for example, whether he is overtired or under the influence of psychotropic substances. Thus, above all in the case of public use of the eye tracking kit, significantly improved results can be achieved, because the measurement accuracy is increased, and also the measurement apparatus can now no longer be perceived by the surroundings and therefore also does not result in negative influences of the test person.

As mentioned before, in a preferred solution, the right eye acquisition camera 4 is arranged in the right arm 100, and the left eye acquisition camera 3 is arranged in the left arm 100 of the U-shaped portion 110. The two eye acquisition cameras 3, 4 are designed as digital cameras and may have an objective lens. The two eye acquisition cameras 3, 4 are each provided to prepare an eye video including individual eye images or individual images of eyes of the human wearing the eye tracking kit. Said eye acquisition cameras 3, 4 must be directed towards the position of the eyeball of the wearer.

As already anticipated, according to one preferred embodiment of eye tracking kit, it is provided that at least one field of view camera 5 is arranged on the third component 14 of the eye tracking kit. The field of view camera 5 is provided to record a field of view video, including individual and successive field of view images. The recordings of the two eye acquisition cameras 3, 4 and the at least one field of view camera 5 can thus be entered in correlation in the field of view video of the respective gaze point of the user (when the kit is fastened to the eye glasses), in case the kit includes also the third component 14.

More than one field of view cameras may also be arranged in the third component 14—of the eye tracking kit.

Furthermore the eye tracking kit has electronical components like a data processing unit and a data interface, the data processing unit being connected to the right eye acquisition camera 4 and the left eye acquisition camera 3. The eye tracking kit furthermore may have an energy accumulator for the energy supply of the eye cameras 3, 4, and also the data processing unit, memory and the data interface. The eye tracking kit furthermore may have an external power supply via cable, or an internal battery and a correspondent power interface, not shown in the schematic drawings.

According to one particularly preferred embodiment of present eye tracking kit, it is provided that the electronical components, including a data processing unit (like a microprocessor) and a connected storage medium, may be arranged in the first component 10, or in the second component 12 or some of them in the first component 10 and other ones in the second component 12.

In a further preferred solution, the third component 14 encloses all the electronical components, like at least a data processing unit, a memory, a data interface, a power unit/interface, in order to give protection to said electronical components and to avoid possible kit hot parts being in contact with nose or face of the user. Furthermore because of these electronical components are enclosed inside the relevant kit frames and the kit frame shapes being sealed and having no sharp edges, the kit disclosed in the present invention is also easy to be cleaned.

It shall be highlighted that the entire recording, initial analysis, and storage of the recorded videos can thus be performed in or by the eye tracking kit itself or by a computer device connected (wireless or via cable) to the eye tracking kit.

A data processing unit may be preferably designed as a combination of a microcontroller or processor together with a RAM. The data processing unit is connected in a signal-conducting manner to a data interface. It can also be provided that the data interface and the data processing unit are formed jointly in hardware, for example, by an ASIC or an FPGA. The interface is preferably designed as a wireless interface, for example, according to the Bluetooth standard or IEEE 802.x, or as a wired interface, for example, according to the USB standard, wherein in this case the eye tracking kit has a corresponding socket, for example, according to micro-USB. Additional sensors might be inserted in the eye tracking kit and connected to the data processing unit.

The data processing unit, the memory and the data interface may be connected at least indirectly to an energy accumulator by circuitry, and are connected in a signal-conducting manner to the three cameras, i.e. the field of view camera 5, the right eye acquisition camera 4, and the left eye acquisition camera 3.

As already mentioned, the present eye tracking kit can be easy fastened and unfastened to/from a common eye glasses 8, like prescription glasses, sun glasses, work/sport glasses, aiming to obtain the eye tracking technology advantages once this technology is able to communicate with other common devices, like smartphones, machinery, computer devices in general.

According to a preferred embodiment, the first component 10 comprises a first component frame 11 arranged facing inwardly the eye glasses 8, i.e. close to user's face, in order to have an optimized field of view to detect user's pupils. While the third component 14, if present, has a third component frame 15 arranged facing outwardly the eye glasses 8, preferably over the nose bridge 88 of the eye glasses 8, in order to avoid possible protruding parts, making the kit more compact (see FIG. 3, 4, 7, 8, 13, 14).

Said first component frame 11 is substantially an U-shaped portion 110, which make the eye tracking kit adaptable to and compatible with the corresponding U-shaped portion of the eye glasses 8 and to the nose bone of a wearer. As already mentioned, in the U-shaped portion 110 are arranged at least one left eye camera 3 and one right eye camera 4, and in a preferred solution a left Infrared LED illuminator 30 and a right Infrared LED illuminator 40, which help to better detect pupil positions of the wearer's eyes, when in use.

Preferably said U-shaped portion 110 further comprises two arms 100, being designed in such a way to arrange themselves to lay down to the inner side face 800 of the nose pads 80 of the eye glasses 8, when the eye tracking kit is fastened to the eye glasses 8. In that case no parts of the eye tracking kit does interfere with the nose of the user or with the field of view of the eye cameras 3, 4 or with the field of view of the user's eyes (see FIG. 3, 4, 7, 8, 13, 14, 17).

Figure 13:
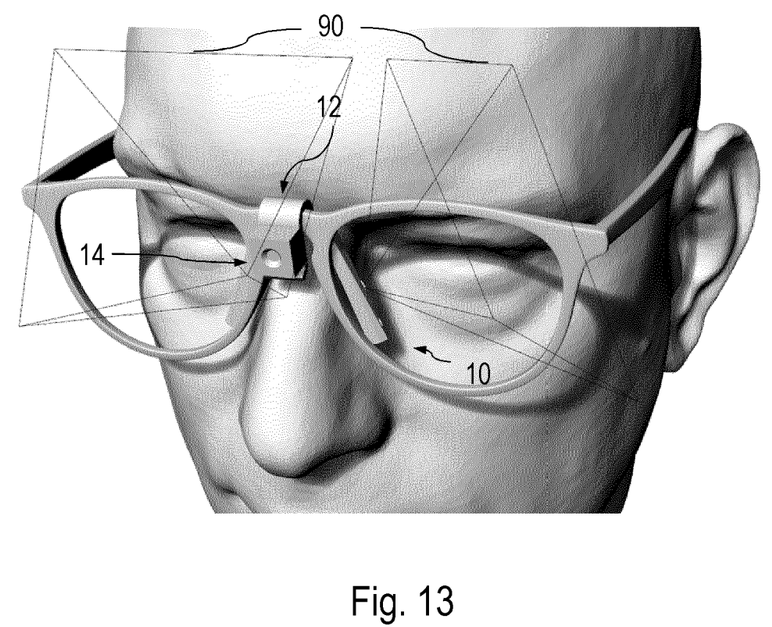
FIGS. 13 and 14 illustrate respectively the field of view of the eye cameras of the kit once fastened to the eye glasses, and the intersection of said field of view over the user's face.
Figure 14:
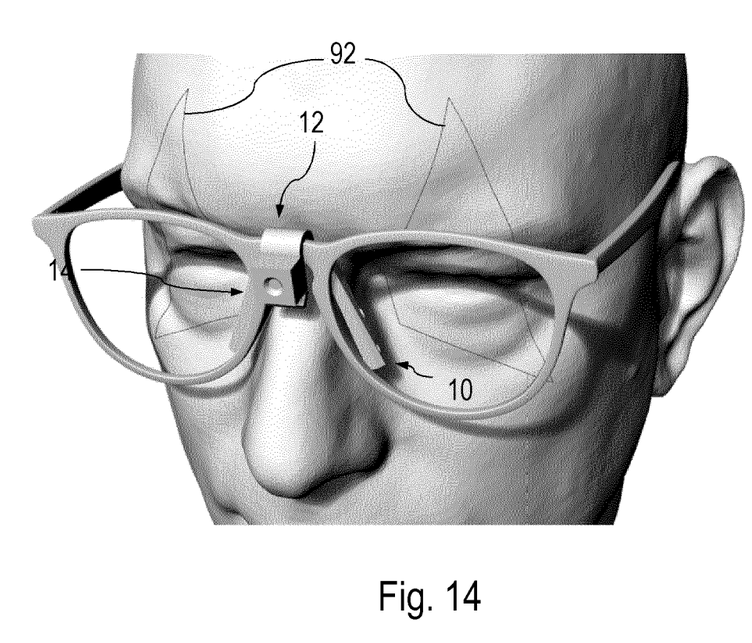

The field of view 90 of the eye cameras 3, 4 are shown in FIG. 13 and the intersection line 92 of said field of views with the face shape of the user are shown in FIG. 14.

As already described, the kit comprises electronical components like a data processing unit, a data memory, a data interface which may include a wireless unit, an internet connection interface. The frame of each components, where these electronical components are arranged, encloses them, conferring them protection against accidentals hits, dust or in general external agents which might compromise said component operations (the drawings provided are schematic and do not have limiting purposes).

The mentioned field of view camera 5 is able to detect a plurality of images, as video images, of the field of view of the wearer the eye tracking kit, once fastened when in use. Said field of view camera may be arranged in the third component frame 15 facing outwardly the eye glasses 8 when in use, or may be arranged in a portion of the third component frame 15 configured to be higher than the upper portion of the frame of the eye glasses 8 when the eye tracking kit is fastened to the eye glasses 8.

The eye tracking kit is therefore able to give to a further computer device remotely connected or to other devices in general, gaze information identifying movements of the user's gaze, once the first component 10, the second component 12 and the third component 14 are fixed and connected each others through know methods. Said information are in general represented by visual points on related visual representations of the field of view of the user wearing the eye tracking kit, fastened to his/her eye glasses 8.

The second component 12, has a second component frame 13, housing the hanger 7, configured to easily and stably fasten the eye tracking kit to the nose bridge 88 or to the upper frame portion of the eye glasses 8. The hanger 7 is furthermore provided with an ending portion 150, allowing a user to easily unfasten the eye tracking kit from the normal pair of glasses 8 (see FIG. 1). Said ending portion 150 may be designed for all the embodiments described in the present specification. The user in any case may unfasten the kit from the eye glasses 8, leveraging on the third component 14.

Figure 1:
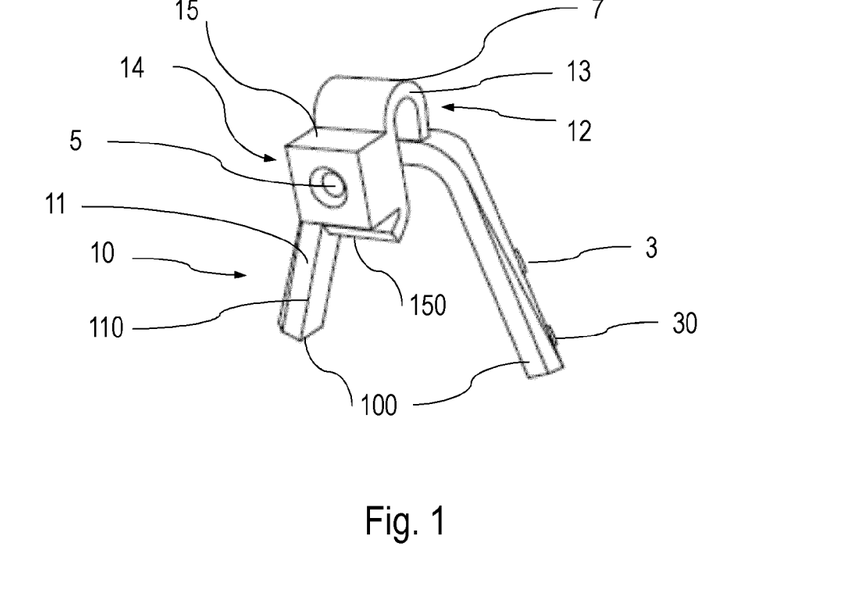
FIGS. 1 and 2 illustrate respectively a front view and a back view of a first preferred monolithic embodiment of the kit according to the present invention.
Figure 2:
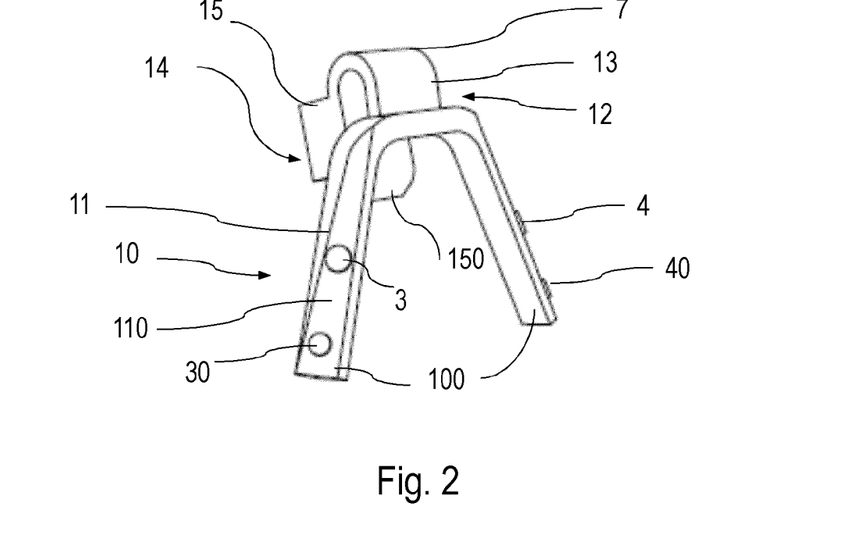
Figure 3:
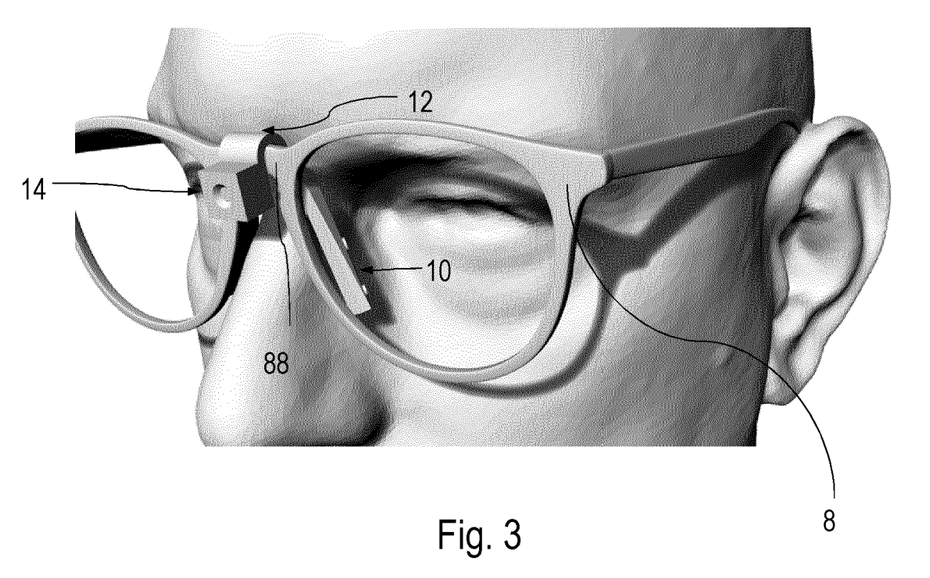
FIGS. 3 and 4 illustrate respectively a front view and a back view of the first preferred monolithic embodiment of the kit according to the present invention (without ending portion), once fastened to the eye glasses.

In a first preferred solution the hanger 7 is a hook configured to engage the nose bridge 88 of the eye glasses 8 from top to bottom (see FIG. 1, 2). This embodiment is particularly suitable to nose bridges 88 with a reduced height.

Figure 5:
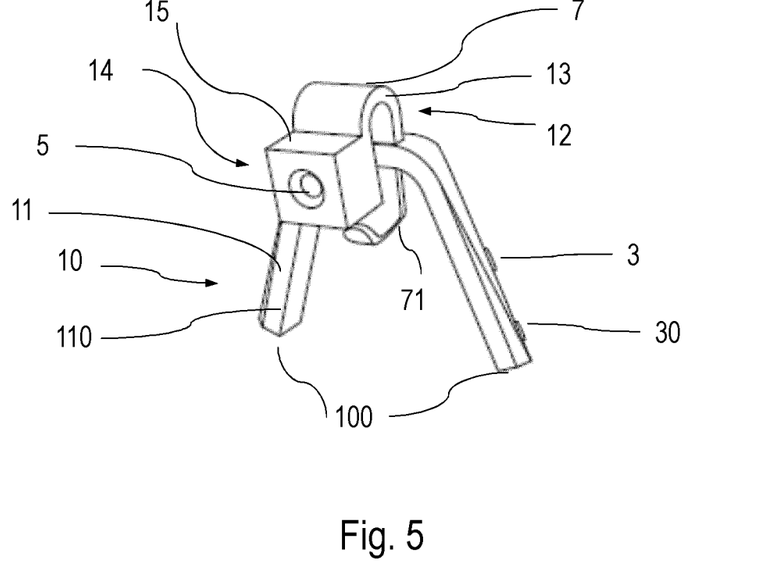
FIGS. 5 and 6 illustrate respectively a front view and a back view of a variant of the first preferred monolithic embodiment of the kit according to the present invention.
Figure 6:
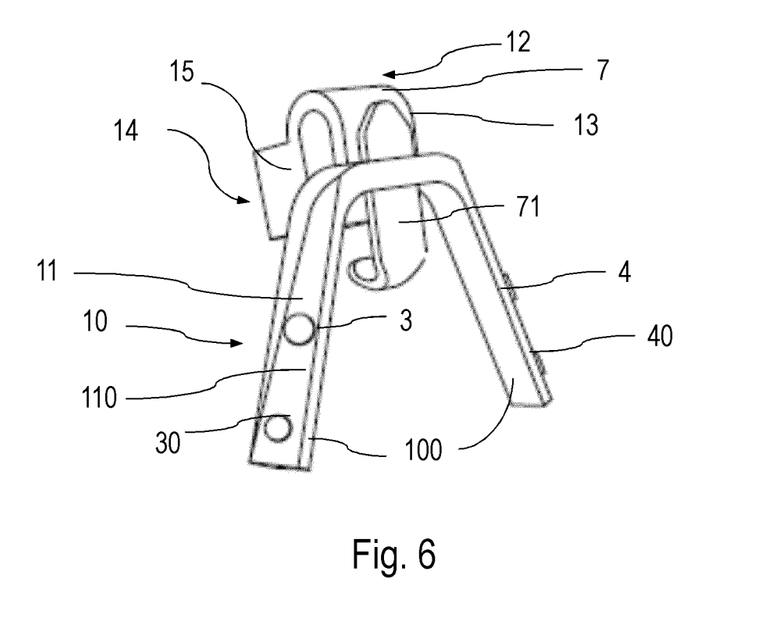
Figure 7:
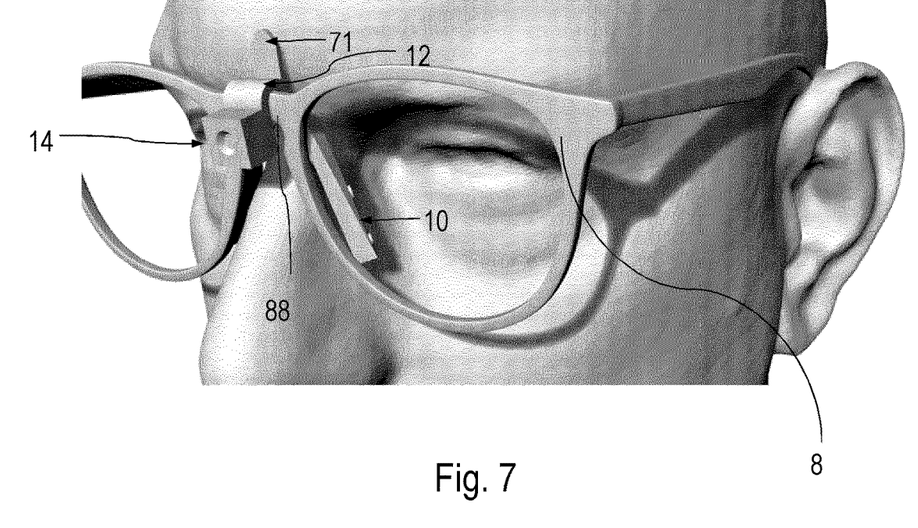
FIG. 7 illustrates a front view of the variant of the first preferred monolithic embodiment of the kit according to the present invention, once fastened to the eye glasses.
Figure 8:
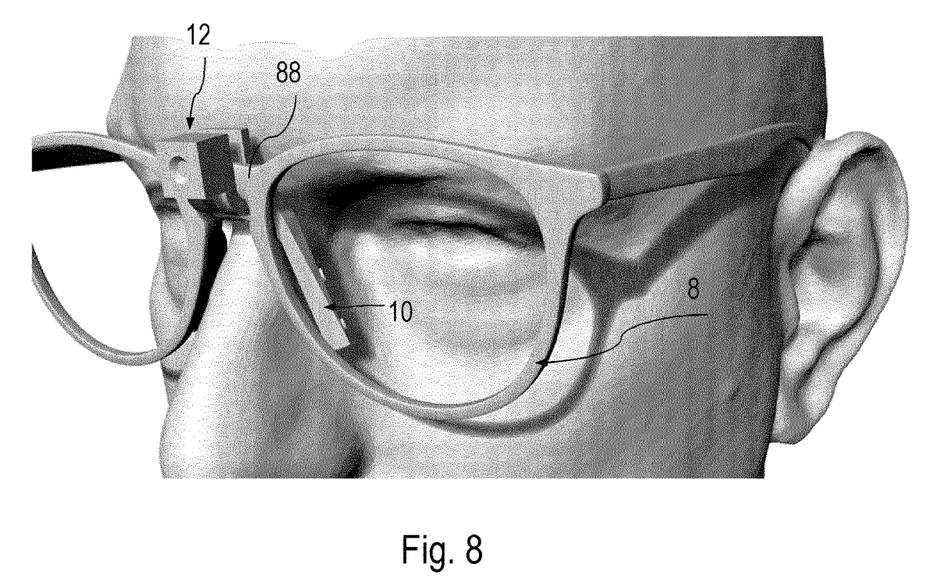
FIG. 8 illustrates a front view of a second preferred monolithic embodiment of the kit according to the present invention, once fastened to the eye glasses.
Figure 9:
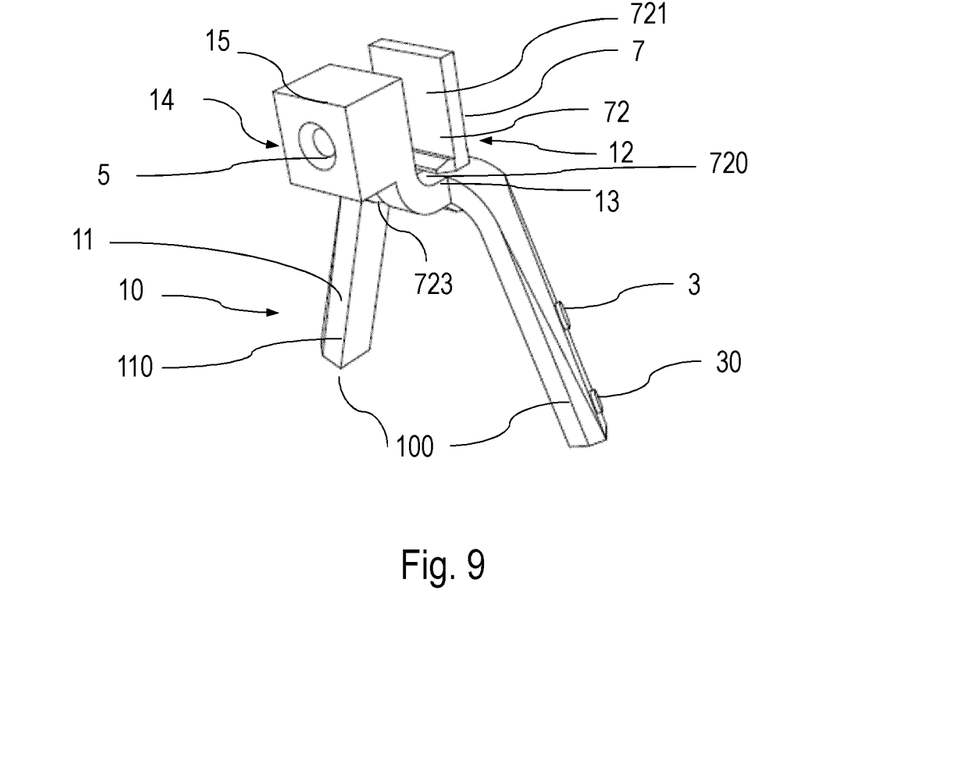
FIGS. 9 and 10 illustrate respectively a front view and a back view of the second preferred monolithic embodiment of the kit according to the present invention.
Figure 10:
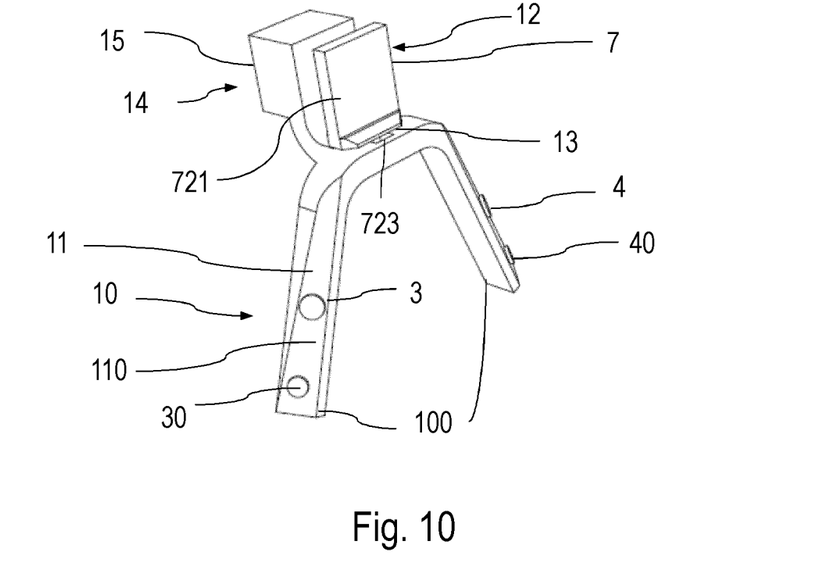

In a further variant of said first solution, the hanger 7 has an adjuster 71 configured to regulate the height position of the arms 100 compared to the nose bridge 88 of the eye glasses 8, in order the eye cameras 3, 4 being able to detect the pupils of the user and to adjust the hanger 7 to different nose bridge heights (see FIG. 5, 6).

Said adjuster 71 may be made for instance, by an element sliding up and down within a correspondent slot, and fixable in a due position via known mechanical mechanism (see FIG. 6).

According to a second preferred embodiment (see FIG. 8, 9, 10, 17), the hanger 7 is a housing 72 defined by a seat 720, wherein is seated from top to bottom the nose bridge 88 or the central portion of the upper frame of the eye glasses 8. The housing 72 is also defined by a side wall 721 which firmly keep the nose bridge 88 or the central portion of the upper frame of the glasses 8 pressed against the back side of the third component frame 15 when in use. This particular embodiment is particularly suitable also to nose bridges 88 with a large height.

In a further variant of said second solution, the hanger 7 further comprising an adjuster 723 configured to regulate the side position of the side wall 721 of the housing 72, in order to optimize the position of the eye cameras 3, 4 to be able to detect the pupils of the user and at the same time to fix properly the second component 12 to the nose bridge 88 of the eye glasses 8. Said adjuster 723 may be made for instance, by a shaft sliding within a correspondent guide, and fixable in the due position via known mechanical mechanism (see FIG. 10).

Figure 11:
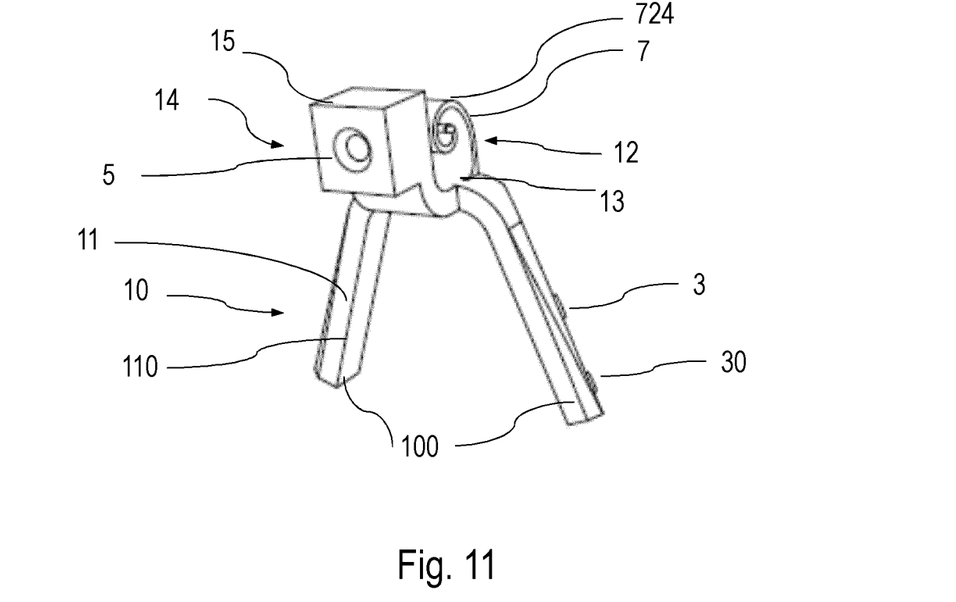
FIGS. 11 and 12 illustrate respectively a front view and a back view of a third preferred monolithic embodiment of the kit according to the present invention.
Figure 12:
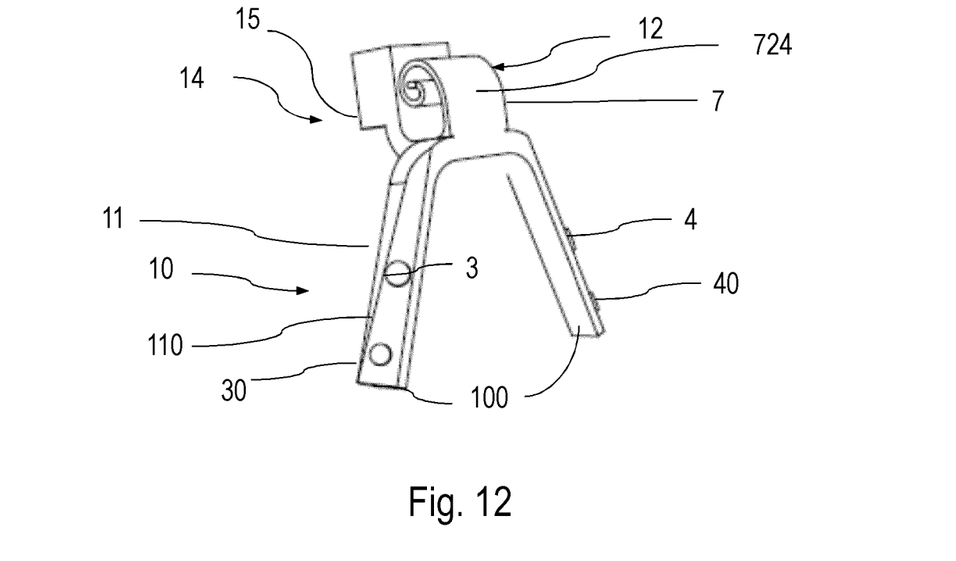

According to a third preferred embodiment the hanger 7 is a spiral 724 (see FIG. 11, 12), configured to be wrapped and unwrapped around the nose bridge 88 or the central portion of the upper frame of the glasses 8 when in use. This embodiment may be adaptable to many different cross section of the nose bridge 88 of the eye glasses 8.

The kit disclosed in the present invention, due to its dimension reduced size and to its described configuration, results in a very light weighted kit, not affecting the user's comfort, when he is wearing his own eye glasses to which is fastened the kit.

The present invention further relates to a method for fastening an eye tracking kit to eye glasses 8 or a augmented/virtual/mixed reality glasses, or to visual remote guidance devices in general, acting on the hanger 7 provided in the second component 12, wherein the eye glasses 8 and the eye tracking kit have structures already described in this specification, according to all the embodiments described.

The present invention further relates to a method for unfastening an eye tracking kit from eye glasses 8 or a augmented/virtual/mixed reality glasses, or to visual remote guidance devices in general, leveraging on the hanger 7 provided in the second component 12 or on the third component 14, wherein the eye glasses 8 and the eye tracking kit have structures already described in this specification, according to all the embodiments described.

The present invention further relates to an eye tracking device comprising a pair of eye glasses 8 and the eye tracking kit, wherein the eye glasses 8 and the eye tracking kit have structures already described in this specification, according to all the embodiments described.

What is claimed is:

1. An eye tracking kit configured to be fastened and unfastened to and from a pair of eye glasses thus creating an eye tracking device, said kit comprising:
   a first component comprising a U-shaped portion, the U-shaped portion being compatible with a second U-shaped portion of the eye glasses and with the nose bone of a user when in use, said first component housing at least one left eye camera and one right eye camera, said eye cameras being arranged in the U-shaped portion to detect in a plurality of images pupil positions of the user, the U-shaped portion being placed facing inwardly, said U-shaped portion further comprising two arms laying down an inner side face of nose pads of the eye glasses when the eye tracking kit is fastened to the eye glasses, the two arms being separated from the nose pads;

a second component comprising a hanger, configured to stably fasten the kit to a nose bridge of the eye glasses or to a central portion of an upper frame of the eye glasses, when the first component is firmly fixed to the second component in order to form together a single unitary structure and the second component is fastened to the eye glasses; and electronical components comprising at least a data processing unit, a memory, a data interface, said electronical components configured to connect the kit to a computer device remotely connected or to other devices in general, and to send to said computer device eye movement information of the user wearing the eye glasses to which is fastened the eye tracking kit.

2. The kit according to claim 1, wherein the first component and the second component are made to form a single monolithic unitary structure.

3. The kit according to claim 1, further comprising a third component having a third component frame comprising at least a field of view camera configured to detect in a plurality of images the field of view of the wearer, said third component being fixed to the second component when in use.

4. The kit according to claim 3, wherein the first component, the second component and the third component form a single monolithic unitary structure.

5. The kit according to claim 1, wherein the hanger in the second component is configured to unfasten the eye tracking kit from the eye glasses.

6. The kit according to claim 3, wherein the kit is configured in such a way that the field of view camera in the third component is placed facing outwardly.

7. The kit according to claim 1, wherein the hanger is a hook configured to engage the nose bridge or the central portion of the upper frame of the eye glasses from top to bottom.

8. The kit according to claim 7, wherein the hook has an ending portion, allowing a user to unfasten the kit from the eye glasses.

9. The kit according to claim 7, further comprising an adjuster configured to regulate the height position of the arms compared to the hanger, in order the eye cameras be able to detect in an optimized way the pupils of the user.

10. The kit according to claim 7, wherein the hanger is a housing defined by a seat and a side wall, wherein the seat is configured to receive the nose bridge or the central portion of the upper frame of the glasses on a top side of the seat, and the side wall is configured to firmly keep the nose bridge or the central portion of the upper frame of the glasses pressed against the back side of the third component frame when in use.

11. The kit according to claim 10, wherein the hanger further comprising an adjuster configured to regulate the side position of the side wall of the housing, in order to optimize the position of the eye cameras to be able to detect the pupils of the user.

12. The kit according to claim 7, wherein the hanger is a spiral configured to be wrapped and unwrapped around the nose bridge or the central portion of the upper frame of the glasses when in use.

13. A method for fastening an eye tracking kit to a pair of eye glasses, comprising:

providing eye glasses comprising at least a nose bridge or a central portion of an upper frame;

providing an eye tracking kit comprising a first component having a U-shaped portion, the U-shaped portion compatible with a second U-shaped portion of the eye glasses and with a nose bone of a user when in use, the first component housing at least one left eye camera and one right eye camera, the eye cameras being arranged in a U-shaped portion to detect in a plurality of images pupil positions of the user, the U-shaped portion facing inwardly and comprising two arms laying down an inner side face of nose pads of the eye glasses when the eye tracking kit is fastened to the eye glasses, the two arms being separated from the nose pads, said kit further comprising a second component comprising a hanger, said kit further comprising electronical components comprising at least a data processing unit, a memory, and a data interface; and fastening the eye tracking kit onto the nose bridge or the central portion of an upper frame of the eye glasses via the hanger provided in the second component, when the first component is firmly fixed to the second component in order to form together a single unitary structure.

14. An eye tracking device comprising:

a pair of eye glasses comprising at least a nose bridge or a central portion of an upper frame; and an eye tracking kit comprising a first component comprising a U-shaped portion, the U-shaped portion being compatible with a second U-shaped portion of the eye glasses and with the nose bone of a user when in use, said first component housing at least one left eye camera and one right eye camera, said eye cameras being arranged in the U-shaped portion to detect in a plurality of images pupil positions of the user, the U-shaped portion facing inwardly and comprising two arms laying down an inner side face of nose pads of the eye glasses when the eye tracking kit is fastened to the eye glasses, the two arms being separated from the nose pads;

a second component comprising a hanger; and electronical components comprising at least a data processing unit, a memory, a data interface, said electronical components configured to connect the kit to a computer device remotely connected or to other devices in general, and to send to said computer device eye movement information of the user wearing the eye glasses to which is fastened the eye tracking kit.

15. The eye tracking device according to claim 14, wherein the first component and the second component are made to form a single monolithic unitary structure.

16. The kit according to claim 1, wherein the pair of eye glasses comprise common eye glasses.

17. The method according to claim 13, wherein the electronical components are configured to connect the eye tracking kit to a computer device or to other devices in general, and to send to the computer device eye movement information of the user wearing the eye glasses to which is fastened the eye tracking kit.

18. The method according to claim 13, wherein eye glasses comprise common eye glasses.

19. The eye tracking device according to claim 14, wherein the hanger is configured to stably fasten the kit to a nose bridge of the eye glasses or to a central portion of an upper frame of the eye glasses, when the first component is firmly fixed to the second component in order to form together a single unitary structure and the second component is fastened to the eye glasses.

20. The eye tracking device according to claim 14, wherein the pair of eye glasses comprise common eye glasses.

* * * * *